United States Patent
Rothschild (10) Patent No.: US 8,854,499 B2
(45) Date of Patent: *Oct. 7, 2014

(54) DEVICE AND METHOD FOR EMBEDDING AND RETRIEVING INFORMATION IN DIGITAL IMAGES

(76) Inventor: Leigh M. Rothschild, Sunny Isles Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/290,258

(22) Filed: Oct. 29, 2008

(65) Prior Publication Data

US 2009/0059034 A1 Mar. 5, 2009

Related U.S. Application Data

(63) Continuation of application No. 11/051,069, filed on Feb. 4, 2005, now Pat. No. 7,456,872, which is a continuation-in-part of application No. 11/020,459, filed on Dec. 22, 2004, now abandoned, which is a continuation-in-part of application No. 10/998,691, filed on Nov. 29, 2004, now Pat. No. 7,450,163.

(51) Int. Cl.
- *H04N 5/76* (2006.01)
- *H04N 1/21* (2006.01)
- *H04N 1/32* (2006.01)
- *H04N 5/77* (2006.01)
- *G06F 17/30* (2006.01)
- *H04N 5/907* (2006.01)
- *H04N 9/82* (2006.01)
- *H04N 9/804* (2006.01)
- *H04N 5/765* (2006.01)
- *H04N 101/00* (2006.01)

(52) U.S. Cl.
CPC ......... *H04N 1/32144* (2013.01); *H04N 1/2187* (2013.01); *H04N 1/32112* (2013.01); *H04N 5/772* (2013.01); *H04N 5/907* (2013.01); *H04N 2201/3249* (2013.01); *H04N 9/8216* (2013.01); *H04N 2201/3225* (2013.01); *H04N 1/32128* (2013.01); *H04N 9/8047* (2013.01); *H04N 2201/3226* (2013.01); *G06F 17/30265* (2013.01); *H04N 2201/3274* (2013.01); *H04N 1/2191* (2013.01); *H04N 2201/3267* (2013.01); *H04N 2201/3271* (2013.01); *H04N 5/765* (2013.01); *H04N 2201/327* (2013.01); *H04N 2201/3264* (2013.01); *H04N 9/8227* (2013.01); *H04N 1/2179* (2013.01); *H04N 2101/00* (2013.01)

USPC .................................. 348/231.99; 348/211.1

(58) Field of Classification Search
USPC ........ 348/231.2–231.6, 207.99, 207.1, 211.1, 348/211.2, 211.5, 211.6; 455/556.1, 556.2, 455/557; 358/479, 906, 909.1

See application file for complete search history.

(56) References Cited

U.S. PATENT DOCUMENTS 6,023,241 A * 2/2000 Clapper .................... 342/357.32
6,282,362 B1 8/2001 Murphy et al.

(Continued)

*Primary Examiner* — Aung S Moe
(74) *Attorney, Agent, or Firm* — Atanu Das; Techlaw LLP (57) ABSTRACT

A digital imaging device and method for embedding and retrieving of information in digital images are provided. The digital imaging device includes a capture module for capturing an image and creating a digital image file; a locational information module for determining a location of the device when capturing the image; and a processing module for associating the location information to the digital image file. The device further includes a user verification module for verifying an identity of a user of the device at a time of image capture and an encryption module for encrypting the digital image file and associated information. The method provides for securing information associated with the digital images and for verifying activities of a user.

24 Claims, 8 Drawing Sheets

(56) References Cited

U.S. PATENT DOCUMENTS

| | | |
|---|---|---|
| 6,295,391 B1 | 9/2001 | Rudd et al. |
| 6,373,551 B2 | 4/2002 | Manico et al. |
| 6,642,959 B1 | 11/2003 | Arai |
| 6,657,661 B1 | 12/2003 | Cazier |
| 6,674,923 B1 | 1/2004 | Shih et al. |
| 6,714,736 B2 | 3/2004 | Manico et al. |
| 6,810,323 B1 * | 10/2004 | Bullock et al. ............... 701/206 |
| 6,883,146 B2 | 4/2005 | Prabhu et al. |
| 6,947,571 B1 | 9/2005 | Rhoads et al. |
| 7,002,625 B2 * | 2/2006 | Takahashi .................. 348/231.2 |
| 7,006,146 B1 * | 2/2006 | Tanaka et al. ................ 348/376 |
| 7,110,964 B2 | 9/2006 | Tengler et al. |
| 7,123,782 B2 | 10/2006 | Shih et al. |
| 7,154,536 B2 | 12/2006 | Kuwayama |
| 7,154,621 B2 | 12/2006 | Rodriguez et al. |
| 7,180,622 B2 | 2/2007 | Cooper |
| 7,379,978 B2 | 5/2008 | Anderson et al. |
| 7,415,662 B2 | 8/2008 | Rothmuller et al. |
| 2002/0063901 A1 | 5/2002 | Hicks |
| 2003/0063194 A1 | 4/2003 | Nishiyama et al. |
| 2004/0125208 A1 * | 7/2004 | Malone et al. ............. 348/207.1 |
| 2004/0141084 A1 | 7/2004 | Kurakata |
| 2004/0189807 A1 | 9/2004 | Smith |
| 2005/0036042 A1 | 2/2005 | Haas et al. |
| 2005/0036656 A1 * | 2/2005 | Takahashi .................... 382/100 |
| 2005/0144189 A1 | 6/2005 | Edwards et al. |
| 2005/0258246 A1 | 11/2005 | Wolff et al. |
| 2006/0047704 A1 * | 3/2006 | Gopalakrishnan ......... 707/104.1 |
| 2006/0114337 A1 | 6/2006 | Rothschild |
| 2006/0114338 A1 | 6/2006 | Rothschild |
| 2006/0114514 A1 | 6/2006 | Rothschild |
| 2006/0114516 A1 | 6/2006 | Rothschild |
| 2006/0176516 A1 | 8/2006 | Rothschild |

* cited by examiner

DEVICE AND METHOD FOR EMBEDDING AND RETRIEVING INFORMATION IN DIGITAL IMAGES

CROSS REFERENCE TO RELATED APPLICATIONS

This application is a continuation application of U.S. Application Ser. No. 11/051,069, filed Feb. 4, 2005, entitled "DEVICE AND METHOD FOR EMBEDDING AND RETRIEVING INFORMATION IN DIGITAL IMAGES", which is a continuation-in-part application of U.S. application Ser. No. 11/020,459, filed Dec. 22, 2004 entitled "SYSTEM AND METHOD FOR EMBEDDING AND RETRIEVING INFORMATION IN DIGITAL IMAGES", which is a continuation-in-part application of U.S. application Ser. No. 10/998,691, filed Nov. 29, 2004 entitled "DEVICE AND METHOD FOR EMBEDDING AND RETRIEVING INFORMATION IN DIGITAL IMAGES", the contents of all of which are hereby incorporated by reference.

BACKGROUND

1. Field

The present disclosure relates generally to digital image and data processing, and more particularly, to devices, systems and methods for embedding and retrieving information in digital images and using the information to organize, process and control the digital images, where the information may include location information, time and date information and user verification information.

2. Description of the Related Art

Photographs are taken for a variety of personal and business reasons. During the course of the year, an individual may take numerous photographs of various events. During these events, quite often there is a variety of different individuals and items present in these photographs. In the prior art, when one desires to catalog these images in a particular order, they usually are left to placing these images manually into photograph albums. This is a very extensive, manual procedure requiring a significant amount of time. In addition, it is very limited with regard to the amount of information that can be associated with the image in a quick and easy manner. While some photo albums allow the writing and placing of text, the entering of this data is a very time consuming and arduous affair. Once having sorted these images into particular albums which may represent categories of interest, it is extremely difficult to retrieve and/or reorganize the images into other categories.

With the advent of digital cameras and digital imaging, the process of organizing images and associating information with the images has become even more difficult. Firstly, upon capturing an image with a digital camera, the camera simply gives the image a numerical file name which usually has no meaning to the user and makes it difficult to retrieve at a later date. Secondly, with the technological advances in file size compression and increased capacity of storage media, several hundred images may be taken before a user downloads the images to a computer or other device, making it a very time consuming task to associate information to each image.

Furthermore, in the current environment, a need exists to verify information captured via digital images and to rapidly transmit this information from one location to another. However, no system or hardware currently exists to enable a user to capture and store images in a secure format containing information on the time and day, specific location and user identification of the images that were captured. This is a critical need, since this information can serve to verify the activities of the user, or to authenticate various data points.

Therefore, a need exists for techniques for easily associating information about an image to the image and using the information to control and retrieve the image. A further need exists for associating location information, date and time information and user verification information to a captured image.

SUMMARY

Devices, systems and methods for capturing, storing, allowing user input, receiving internal input, processing, transmitting, scanning, and displaying digital images is provided. Digital photography has gained a substantial share of the worldwide photographic market. More and more cameras record images in digital form and more and more of these images are stored digitally for retrieval or archival purposes on home and business computers and on the Global Computer Network, e.g., the Internet. The present disclosure describes hardware devices, systems and methods that will facilitate embedding information into digital images of any type (e.g., jpeg, bmp, tiff, etc.) to organize, control and manipulate these images both while in digital form, and later when in printed form.

According to various embodiments, the present disclosure describes methods and systems of encoding digital images whether still images or multiple images (such as various formats of video) with locational information, audio stream information, date and time information, and user identity information, and transmitting this information on the Global Computer Network, e.g., the Internet. The present disclosure also describes a hardware device or devices to be known as a Locational Image Verification Device, (LIVD) that will allow the user to perform the functions indicated above. Additionally, the present disclosure also describes a method of securing the information contained in the digital images so that other parties can assure that this information is genuine and has not been tampered with. Finally, the present disclosure describes a method of printing out these digital images with the locational, date and time, etc. information as part of the image.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail. Throughout the figures like reference numerals represent like elements.

Hardware devices, systems and methods thereof that will enable the embedding and retrieving of information in digital images are provided. The embedded information will enable a user to organize, process and control these images. The present disclosure will describe techniques for encoding digital images, whether single or multiple (such as various formats of video), with locational information, date and time information, and user verification information and for transmitting this information on the Global Computer Network, e.g., the Internet.

Figure 1A:
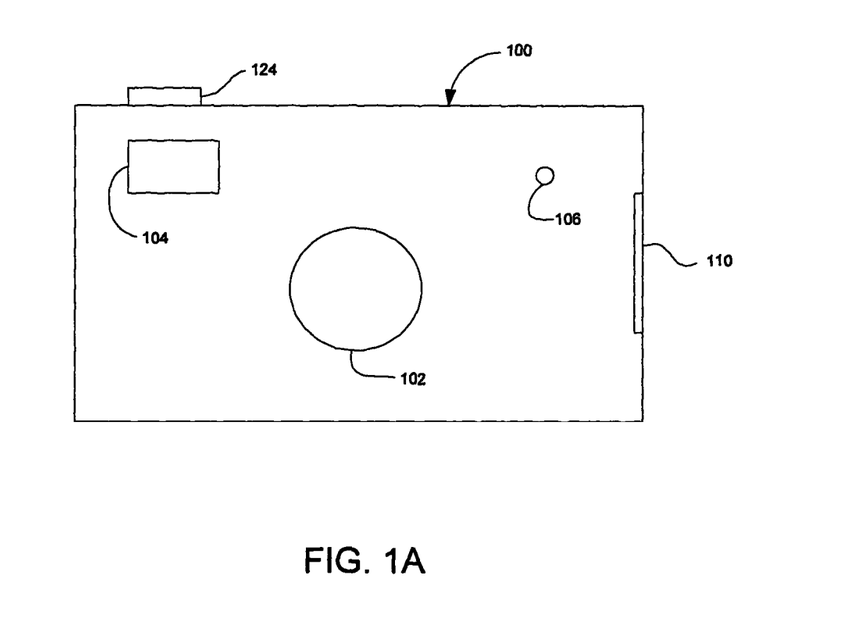
FIG. 1A is front view of a device for capturing digital images and embedding information in the captured images according to an embodiment of the present disclosure.
Figure 1B:
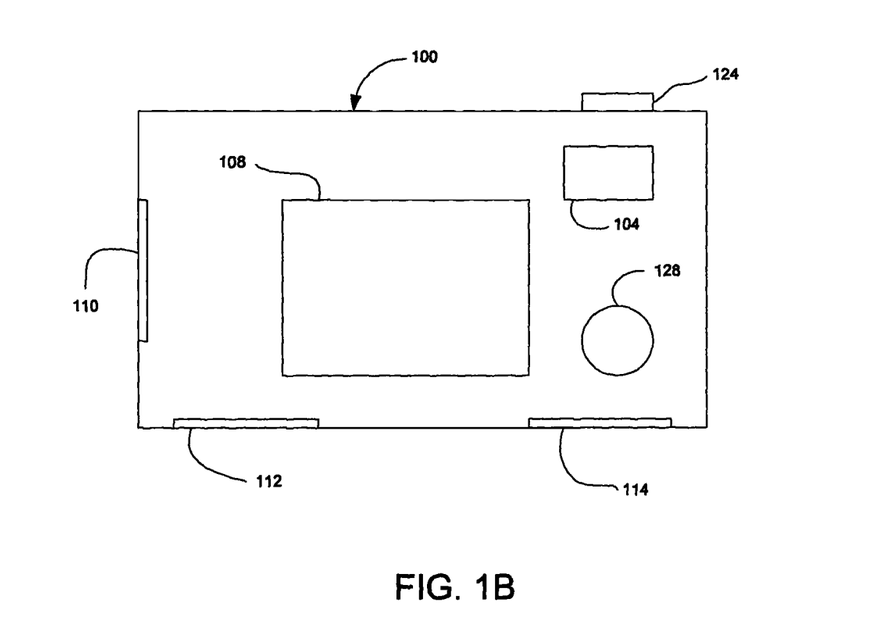
FIG. 1B is a rear view of the device illustrated in FIG. 1A.

Referring to FIGS. 1A and 1B, a device 100 for capturing images and associating information about the captured images is shown. The device 100 includes a lens 102 coupled to a capture module, which will be described in detail below, for capturing an image and a viewfinder 104 for correctly positioning the device when capturing an image. The device 100 further includes a microphone 106 for acquiring audio, from the user of the device or from the subject of the image, which may be associated with the image.

A rear side of the device 100 is illustrated in FIG. 1B where a display module 108 is provided for displaying the captured image. As will be described in more detail below, the display module 108 may include a touch screen for facilitating user input of information to be associated with a digital image. The device 100 further includes a storage module 110 for storing a plurality of images, a transmission module 112 for transmitting the plurality of images to another device, e.g., a personal computer, a personal digital assistant (PDA), a server residing on the Internet, etc., and a scanning module 114 for scanning and inputting information to be associated with an image and for reading information from printed images.

Figure 2:
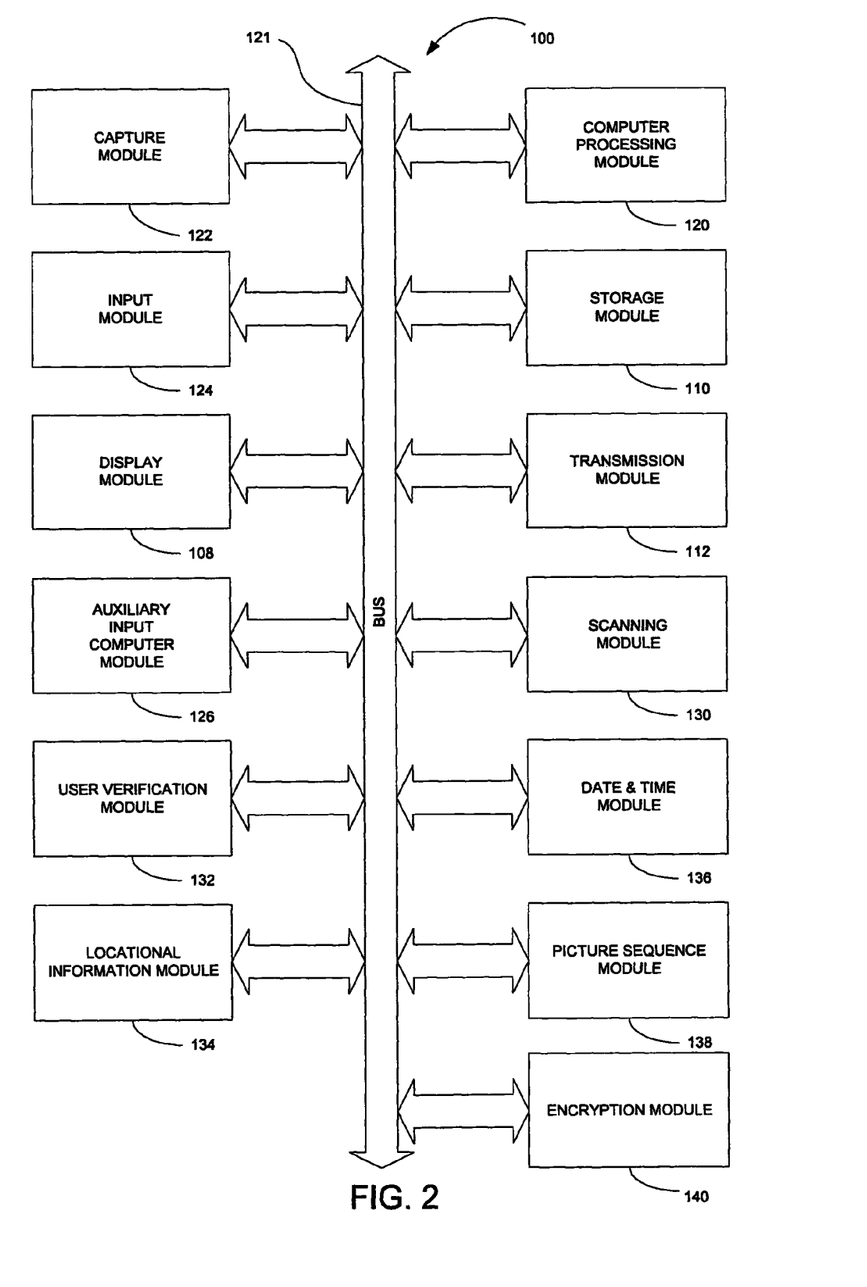
FIG. 2 is a block diagram of various modules included in a device for capturing images and embedding information in the images in accordance with the present disclosure.

Referring to FIG. 2, the various components of the device 100 will now be described. The device will contain a computer processing module 120, e.g., a microprocessor. The computer processing module 120 will use computer software instructions that have been programmed into the module and conventional computer processing power to interact and organize the traffic flow between the various other modules. It is to be understood that the present disclosure may be implemented in various forms of hardware, software, firmware, special purpose processors, or a combination thereof. A system bus 121 couples the various components shown in FIG. 2 and may be any of several types of bus structures including a memory bus or memory controller, a peripheral bus, and a local bus using any of a variety of bus architectures. The device also includes an operating system and micro instruction code preferably residing in read only memory (ROM). The various processes and functions described herein may either be part of the micro instruction code or part of an application program (or a combination thereof) which is executed via the operating system.

It is to be further understood that because some of the constituent device components and method steps depicted in the accompanying figures may be implemented in software, the actual connections between the device components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Capture module 122 will capture an image desired by the user in digital form. The capture module includes an image sensor, an analog-to-digital (A/D) converter and a digital signal processor (DSP). As the user pushes the device's shutter button 124, light is allowed to enter through the lens 102 and shine on the image sensor, e.g., a charge-coupled device (CCD) or complimentary metal-oxide semiconductor (CMOS). The image sensor includes preferably millions of photosensors, e.g., pixels, wherein each pixel absorbs the light and transforms the light into an electric charge proportional to the intensity of light. Each charge is transmitted to an A/D converter where the charge is converted into a digital value representing the color the pixel will be, e.g., representing different intensities of red, green and blue. The digital values are then passed to the digital signal processor which enhances the image, compresses it and then stores it in a digital file format in the storage module 110. The storage module 110 includes internal storage memory, e.g., random access memory (RAM), or removable memory such as a CompactFlash card, Memory Stick, SmartMedia, MultiMediaCard (MMC), SD (Secure Digital) memory, or any other memory storage that exists currently or will exist in the future. The digital file format utilized to store the image is not critical, but may include standard file formats which currently exist or will exist in the future for example jpeg, tiff, bmp, gif, pcx, png or other file formats. If multiple images are captured, the images may be stored in various video formats which currently exist including Divx, Mpeg-2, Mpeg-3, Mpeg-4, Mpeg-5, Quicktime, or other video formats.

The device 100 will also contain a display module 108 for the user to view acquired images. This display may be in any current form in the art, including Liquid Crystal Displays (LCD), Light emitting diode displays (LED), Cathode Ray Tube Displays (CRT) or any other type of display currently existing or existing in the future. The display module 108 will also include an audio output device 128, e.g., a speaker, headphone jack, etc., allowing the user to also hear audio output from the hardware device. An additional but optional embodiment of the present disclosure may also include video or computer output jacks that will allow the user to hook the subject hardware device to an external television display device or a computer.

The hardware device 100 of the present disclosure will contain a user input module 124 to either receive user instructions via text input by the way of a standard keyboard interface, or a character recognition capture device which translates user text input into alphanumeric characters. Preferably, the character recognition device is a touch screen which overlays the display module 108 and text is entered via a pen-like stylus. Such input devices are standard and currently available on many electronic devices including portable digital assistants (PDAs) and cellular telephones. Optionally, a microphone 106 may be further coupled to the input module 124 for capturing any audio information spoken by the user and the input module will further include an analog-to-digital (A/D) converter for converting the spoken audio information into a digital format. Furthermore, the input module may include a voice recognition processor that translates the digital human voice into alpha numeric characters for user input.

The user will utilize the user input module after an image is captured to enter various data that will either be stored as a file associated with the digital image file or alternatively written as an additional part of the digital image file. By example, if the digital image is recorded by the hardware device as jpg101 or tif101 or bmp101 where these descriptions indicate the name of the captured digital image, then another file will be created for each captured digital image. This file would be the information associated file. In the above example, the image jpg101 would now have an additional file called info101 (or any other name that the hardware device selects). This digital file would receive and contain the user inputted information. Alternatively, the user input module may write its information directly to the previously stored digital file. By example, if the digital image is recorded by the hardware device as jpg101 or tif101 or bmp101 where these descriptions indicate the name of the captured digital image, then this file will be appended with the additional information written from the user input module, for example, in the header of the digital image file.

The device 100 will also include a user verification module (UVM) 132. The user verification module 132 will indicate and verify the identity of the user of the device 100 at the time of the image capture. The user verification module 132 may execute a password protection algorithm or may include an identity capture device, either incorporated into the device 100 or coupled externally via a cable. The identity capture device may be a biometric device, such as a retinal scanning device, finger print reader, facial recognition reader or another type of user identity verification input device which will collect information on the user to be compared to information that has previously been stored in the device's memory. One such exemplary fingerprint reader is the BioTouch™ fingerprint reader commercially available from Identix Incorporated of Minnetonka, Minn. It is to be noted that identity detection devices such as biometric devices are common and are currently widely in use. It is to be further noted, that identity verification devices that are not yet in use such as DNA detection, etc, would also be compatible with device 100. It is to be appreciated that the information utilized by the user verification module 132 to verify a user may be provided by other existing components of device 100, for example, capture module 122 may capture am image of the face of the user which may then be processed by a facial recognition algorithm executed by the user verification module 132. In this instance, no external hardware would be required.

A locational information module 134 will be provided for determining a location of where an image is being captured. The locational information module 134 may include a receiver and antenna employing conventional locational information processing technology such as Global Positioning Satellite (GPS) Technology, Loran Technology, or any other available locational technology, to indicate the exact location, e.g., latitude, longitude and altitude, of the device 100 at the time of image capture. Exemplary GPS receivers and antennas are described in U.S. Pat. Nos. 5,654,718 and 6,775,612, the contents of both of which are herein incorporated by reference. It is to be appreciated that the latitude, longitude and altitude may be used to interact with maps stored in memory or in the storage module 110 of device 100 to determine the city, state or address of the location where the image was captured. Alternatively, the coordinates may be associated with the image file upon capture and the location will be determined after the image and associated information is transferred to a computer.

Furthermore, the device 100 will include a date and time module 136 and a picture sequence module 138. The date and time module 136 will use standard computer chip processing technology widely in use, or alternatively, input from locational information module 134, e.g., a GPS receiver, to supply the date and time of the image capture. The picture sequence module 138 will record the number of the digital image for the session that the image was captured in, or the image number for the date that the image was captured on.

The device 100 will also include an auxiliary input computer module 126. This module will allow the hardware device to automatically and simultaneously (with image capture) store information in the associated file, or alternatively, in the same file as the digital image. The information from the auxiliary input module 126 will flow directly from the various input modules and processors contained in the hardware device. These modules and processors may include but are not limited to user verification module 132, locational information module 134, date and time module 136, picture sequencing module 138 and various other input processors that will provide additional information relevant to the digital information, all information which the auxiliary input module will store as information in the info files or directly as addenda in the digital image files. Knowledge of the art, indicates that the individual processors such as GPS, date time and voice storage, may be separate processors or may also be incorporated as one computer processor.

The device 100 will also include an encryption module 140. The encryption module 140 will use conventional code encryption algorithms currently in use or that will be in use in the future such as DES, Triple DES, Blowfish, RSA, MD5, etc. to encrypt the data information that comes into the user input module 124 and auxiliary input module 126, and optionally, to encrypt the digital image file. In one embodiment of the present disclosure, the encryption module 140 will always encrypt the data information, but in other embodiments, the user will select whether to encrypt the data or to leave the data unencrypted.

After the digital image is captured and stored on the device 100, these files will be transferred to the user's local computer hardware device or to the Global Computer Network, e.g., the Internet, or to the user's local device and then to the Global Computer Network. This transfer will be done by transmission module 112 including hardwired and/or wireless connectivity. The hardwire connection may include but is not limited to hard wire cabling e.g., parallel or serial cables, USB cable, Firewire (1394 connectivity) cables and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 80211.X (where x denotes the type of transmission), or any other type of communication protocols or systems currently existing or to be developed for wirelessly transmitting data. Furthermore, the transmission module 112 may include a removable memory card slot for accepting any of the various known removable memory cards, transferring the image files to the removable card, and subsequently the images may be uploaded to a computer from the removable memory card by an appropriate reader coupled to the user's computer. The file name of each digital image file and/or associated file will be recorded in a relational database either on the user's local computer or the Global computer network, as will be described in detail below. This database will contain information on any file(s) related to each digital image including audio and video files, or other associated image files.

The user, or any other party, may print out any of the digital images described herein. The printing will be done once the images are stored on the local computer or the Global Computer Network and recorded in a relational database as described above. When the images are printed out, the computer that prints the image will cause the image to be printed with symbology that encodes that file name of the image and file location of the image, or any other coding that will provide access to the file name and file location. This file name will be the assigned name that the image was stored in at the relational database, as well as the assigned location of the relational database whether in the user's local computer or at a stored location on the Global Computer Network. The symbology may be in any form currently practiced in the art including barcodes (e.g., UPC, EAN, PDF417, etc.), photosymbols, standard or specialized text, etc., or any future type of symbology. Of course, as stated, any symbology utilized will represent or lead to the file names and file locations of the digital images.

The device 100 will further include an integrated scanning module 130 that will contain a light source, e.g., LED, and photocell coupled to the computer processing module 120, or alternatively, will includes a separate decoder engine that will decode the data received by the photocell before sending it to the computer processing module 120. Knowledge of the art reveals that many different types of scanners currently exist and the inventor realizes that the type of scanner would depend upon the type of symbology that is utilized in the printed images. The user will be able to scan the printed digital images with the device 100 and the scanning module 130 would scan in the symbology and using standard computer programming and the computer processing module, the device would translate the symbology to extract the name of the digital image and the file locations (whether local or on the Global Computer Network) of the digital image. Alternatively, the scanner may extract some type of marker or symbol, e.g., an identifier, that when presented to the relational database would indicate the file name and file location of the digital images. This information would then be transferred to the transmission module which will transmit it to the local or Global Computer Network which will then submit it to the relational database containing information on the digital images. Using standard computer programming and processing, this database would then locate the stored digital image and associated files/information and also process the users request(s) regarding the digital image.

If the subject hardware device is coupled to a computer via the transmission module 112, then the hardware device 100 will receive back and display the processed requests on the display module 108. By example, a user may scan in a printed digital image with the hardware device 100 and then receive that image for display on his device, along with auxiliary information on the image, and along with auxiliary and associated audio and video files that can be displayed on the hardware device via the display module 108.

Figure 3A:
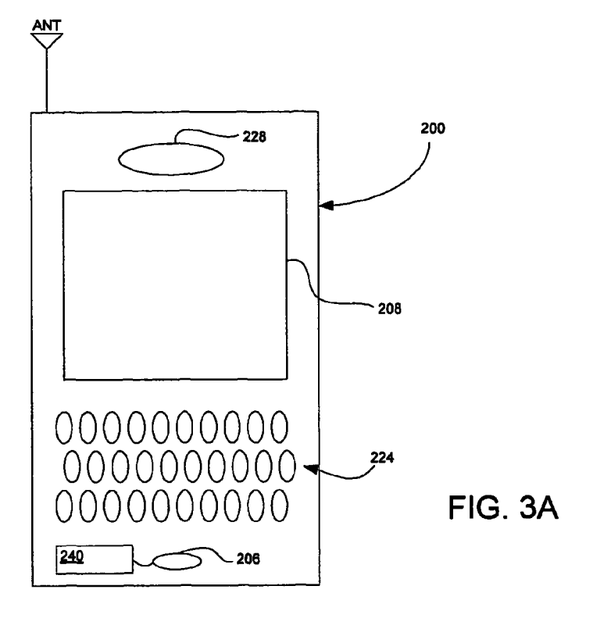
FIG. 3A is front view of a device for capturing digital images and embedding information in the captured images according to another embodiment of the present disclosure.
Figure 3B:
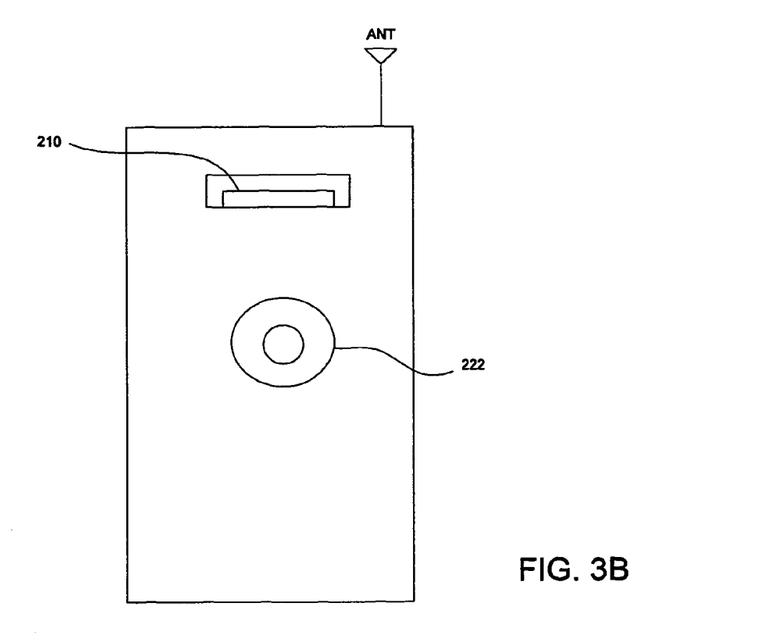
FIG. 3B is a rear view of the device illustrated in FIG. 3A.

Referring to FIGS. 3A and 3B, another embodiment of the present disclosure is illustrated. Here, a device 200 according to the principles of the present disclosure is embodied as a mobile phone including the modules and architecture illustrated in FIG. 2. Device 200 includes a microphone 206 having the same functionality as microphone 106 and is further coupled to a communication module 240 for encoding a user's speech to be transmitted via antenna ANT using CDMA, PCS, GSM or any other known wireless communication technology. Device 200 further includes display module 208 for displaying captured images and preferably the display module will have a touch screen overlaid upon it which will enable user input via a stylus. The user may also enter phone numbers to be dialed via the touch screen. As is known in the mobile phone art, device 200 may include a full QWERTY keyboard 224 as an input module to enter text information to be associated to captured images. Earpiece or speaker 228 may be utilized to play audio clips associated with images in addition to being coupled to the antenna ANT and a decoder for receiving and decoding voice communication from another mobile phone.

Preferably, the antenna ANT is coupled to a transmission module similar to the one described above in relation to FIG. 2. The transmission module will compress and encode captured images for transmission using any known wireless communication technology. Transmitting images via wireless technology will facilitate the transferring of images to an online photo storage site or to an online photo developing service provider.

Referring to FIG. 3B, a rear side of device 200 is shown. Capture module 222 is employed for capturing images and when disposed on a rear side of device 200 is used in conjunction with display module 208 for positioning a subject of the image in lieu of a viewfinder. In this embodiment, the capture module 222 may also be used in conjunction with the scanning module to read symbology associated with an image. Here, the capture module will acquire an image of the symbology and the scanning module will further include a digital signal processor executing an algorithm for deciphering or decoding the symbology from the capture image. The use of an image sensor to read symbology, e.g., a barcode, is known in the art and systems employing such technology is commercially available from Symbol Technologies of New York.

Similar to the embodiments described in relation to FIGS. 1 and 2, device 200 includes a storage module 210 for storing images via a removable memory card.

Figure 4:
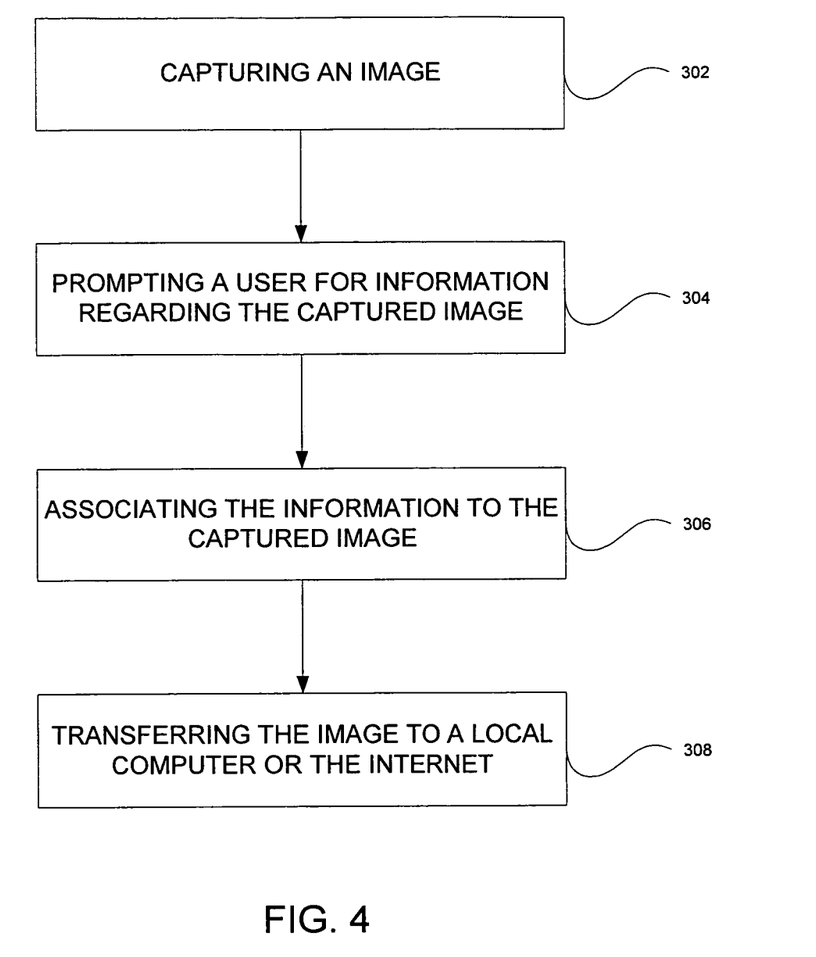
FIG. 4 is a flowchart illustrating a method for embedding information in a digital image according to an embodiment of the present disclosure.

In utilizing the hardware device(s) described herein, the user will be able to accomplish the various applications of the disclosure which are described below in relation to FIG. 4.

A user takes several pictures with his imaging device (step 302). In one example, the picture is of a baby in Las Vegas. The next picture is of a Monet painting hanging in a gallery in Las Vegas. Another picture is of the user's wife. At the end of taking pictures or alternatively, immediately after taking each individual picture, the user goes back to the device 100, 200 and using either keystroke input via input module 124 or voice recognition software via a microphone, or any other input means, the user enters information regarding the pictures. The user is prompted, e.g., either via the display module or by spoken word via the speaker, to provide the following information regarding the pictures, i.e., the images taken (step 304):

(1) The file location to store the photos or images once they are transferred to permanent memory storage, e.g., a local computer or a server residing on the Internet. For the first picture the user indicates that he would like the photo stored under his baby picture file, e.g., a folder on his local computer, for the second picture his famous art file, and for third picture his file with pictures of his wife.

(2) The user is then asked via the speaker, or prompted on the display module 108, 208, if he wants to attach any audio or video to the images to stay associated with the images once they are stored. He indicates that for the first image he wishes to record an audio file indicating: "this is a picture of my baby girl Samantha here in Las Vegas. Boy is she cute." For the second image: "Loved this Monet and had previously seen it in at the Louvre last year" for third: "Jenny is wearing the new dress that I just bought her" also for number three picture please attach the video file entitled Jenny's day in Las Vegas to this picture.

(3) The user now is asked via text input or voice recognition or any other input means, whether they will be storing these photos online. The answer would be either Yes or No. If the user answers Yes, a predetermined site could have been selected and pre-stored in the camera hardware device (for instance the Ofoto or Imagestation site) and selected photos would automatically go to that location for upload when the digital images are transferred.

The hardware device retrieves from the various modules the time and location of the images. The hardware device also retrieves from either memory that was pre-stored in the hardware or via the user verification module 132 the name and identification information on the owner of the hardware device or any guest using the device. Moreover, the hardware device will also store the number of the digital image by recording the order that the image was taken in, e.g., the sequence number, via picture sequence module 138. The user can also flag (select) any images that he would like to have printed or e-mailed.

The various information is then complied and either stored as a separate information file associated to the image or appended to the digital image file and stored for example in the header of the image file (step 306).

The user will now transfer the images to his local computer workstation which may or may not be connected to the Global Computer Network via transmission module 112 (step 308). When the computer receives these imbedded 'smart pix' images, the computer will:

a. Sort and file the images in the file or folder selected including storing the files with the associated information and audio and video attachments;
b. Perform any actions requested for the photos including, e-mail the photos to a selected user or users and print the photos on designated printers in a size pre-selected; and
c. With a connection to the Global Computer Network, automatically upload the photos and associated attached files to the specified server site (Ofoto, or Smartpix, for instance) for storage and retrieval.

Once the images are printed, the user will be enabled, regardless of the time elapsed since the images were taken, to take a hardware device (possibly the camera device that the user utilized to take the images, or another hardware reader device) and scan it over a photo. The device will read the symbology in the images and using standard communications techniques including Wifi or Bluetooth, Infrared, or Cabling, etc., the scanning/reading device will transmit the photo identifier information to a computer processor which then may optionally transfer it to the Global Computer Network. The device will then receive the information back from the local processor or Global Computer Network and will then locate the file or files that contain the image and associated attachments on the local or Global Computer Network.

By example, the user holds the scanning device over images of a child on the beach and an audio track then comes back: "Daddy I love this beach and I love you". The user would also be able to instantly receive information on the photo such as when and where the photo was taken and who the photographer was. The user could also request that the photo be printed to a local printer in a specific size or that the picture be e-mailed to a selected recipient. Other user requests could include asking the computer to display all associated photos, and file attachments, or to store the photo in a selected location on the local computer or the Global Computer Network.

Figure 5:
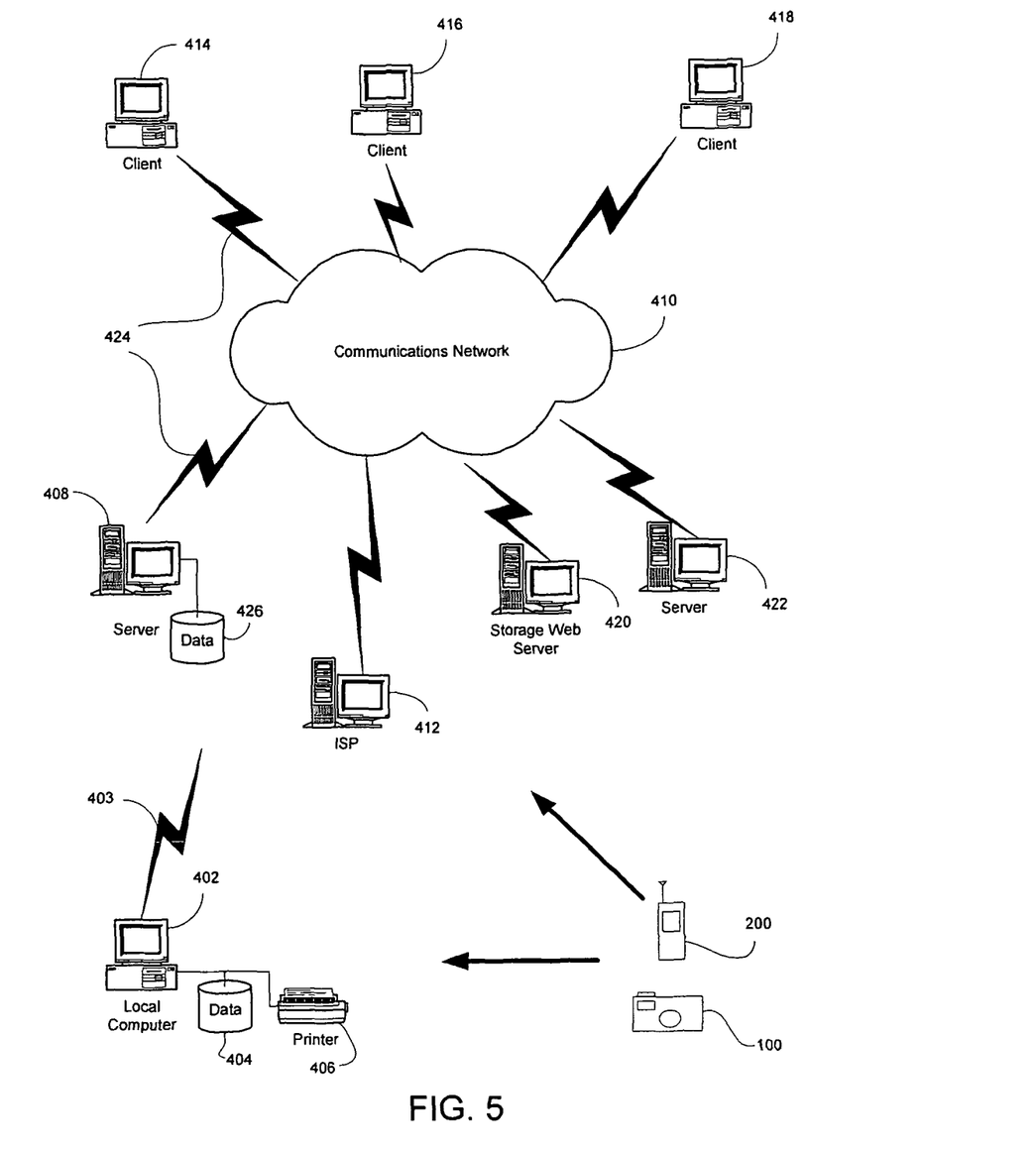
FIG. 5 is a diagram of an exemplary system for managing a plurality of digital images in accordance with an embodiment of the present disclosure.

Referring to FIG. 5, an exemplary system for managing a plurality of digital images in accordance with an embodiment of the present disclosure is illustrated. Digital imaging device 100, 200 will transfer the digital images to a user's local computer 402 or to an online imaging web server 408, e.g., Ofoto, where the plurality of images will be processed and manipulated as will be described below. The user's local computer 402 may connected to communications network 410, e.g., the Internet, by any known means, for example, a hardwired or wireless connection 403. It is to be appreciated that the network 410 may be a local area network (LAN), wide area network (WAN), the Internet or any known network that couples a plurality of computers to enable various modes of communication via network messages. It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, local computer 402 or web server 408. The local computer 402 and web server 408 will include an operating system and micro instruction code. The various processes and functions described herein may either be part of the micro instruction code or part of the application program (or a combination thereof) which is executed via the operating system. In addition, various other peripheral devices may be connected to the computer platform, e.g., the local computer 402 and web server 408, by various interfaces and bus structures, such as a parallel port, serial port or universal serial bus (USB), for example, additional storage devices 404, 426 and a printer 406.

Alternatively, the user's local computer 402 may connect to the network 410 via an Internet Service Provider (ISP) 412, where once connected, the ISP server 412 will manage the flow of the digital images, e.g., e-mailing the images to other users 414, 416, 418 of the network 410, transmitting the images to online storage web servers 420, and/or manage the flow of information from various web sites connected to the network 410, e.g., content providers residing on servers 422. Furthermore, the ISP 412 will include a mail server for handling electronic mail, e.g., e-mail. The mail server will include the appropriate applications and/or servers for handling incoming mail, e.g., Simple Mail Transfer Protocol (SMTP), and outgoing mail, e.g., Post Office Protocol 3 (POP3).

Although the physical environment shows the connected devices as computers, such illustration is merely exemplary and may comprise various digital devices, such as PDAs, network appliances, notebook computers, etc. The computing devices may communicate to the servers 408, 412, 420, 422 and network 410 via any known communication link 424, for example, dial-up, hardwired, cable, DSL, satellite, cellular, PCS, wireless transmission (e.g., 802.11a/b/g), etc. Furthermore, the devices will communicate using the various known protocols such as Transmission Control Protocol/Internet Protocol (TCP/IP), File Transfer Protocol (FTP), Hypertext Transfer Protocol (HTTP), etc.

Figure 6A:
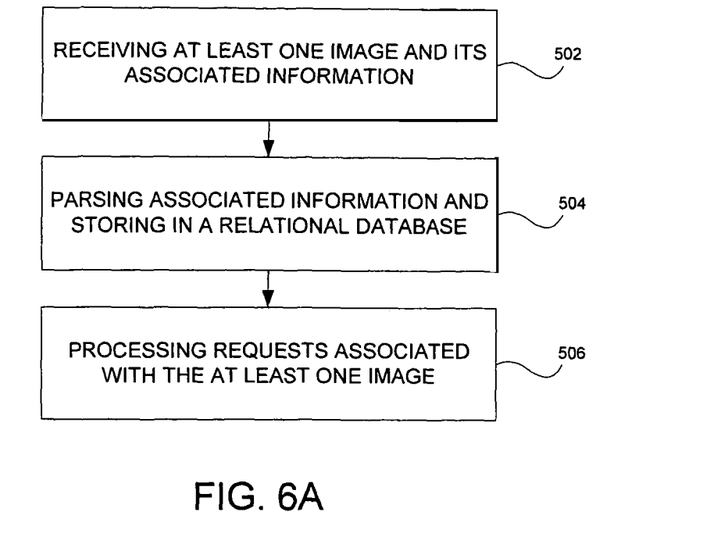
FIG. 6A is a flowchart illustrating a method for receiving at least one image with its associated information and processing requests associated with the at least one image.
Figure 6B:
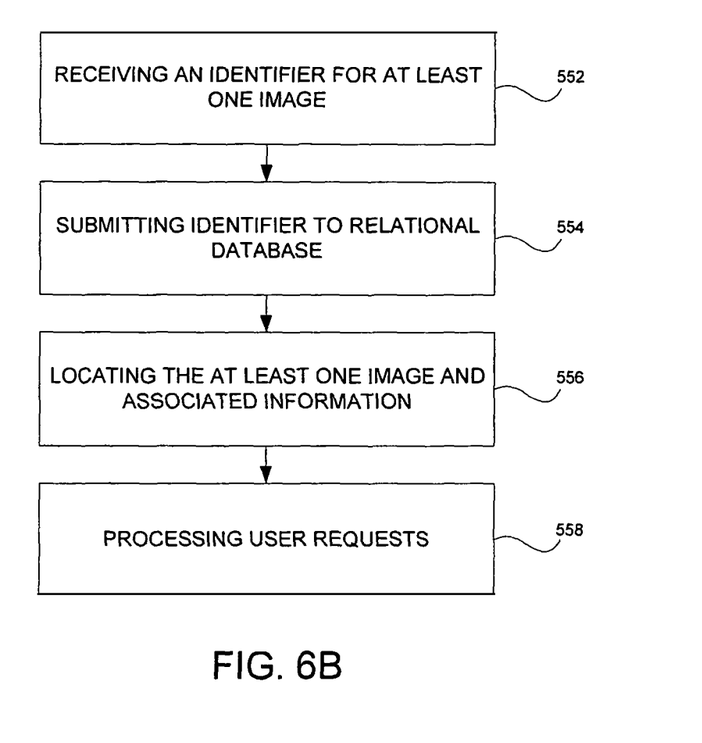
FIG. 6B is a flowchart illustrating a method for retrieving an image and processing user requests.

FIGS. 6A and 6B are flowcharts illustrating methods being executed by programmable instructions either at the local computer 402 or the imaging web server 408. Although the following description will be described in relationship to methods being implemented by software on the local computer 408, the methods can be implemented at web server 408 after the images are transferred to the web server 408 via the Internet.

Figure 7:
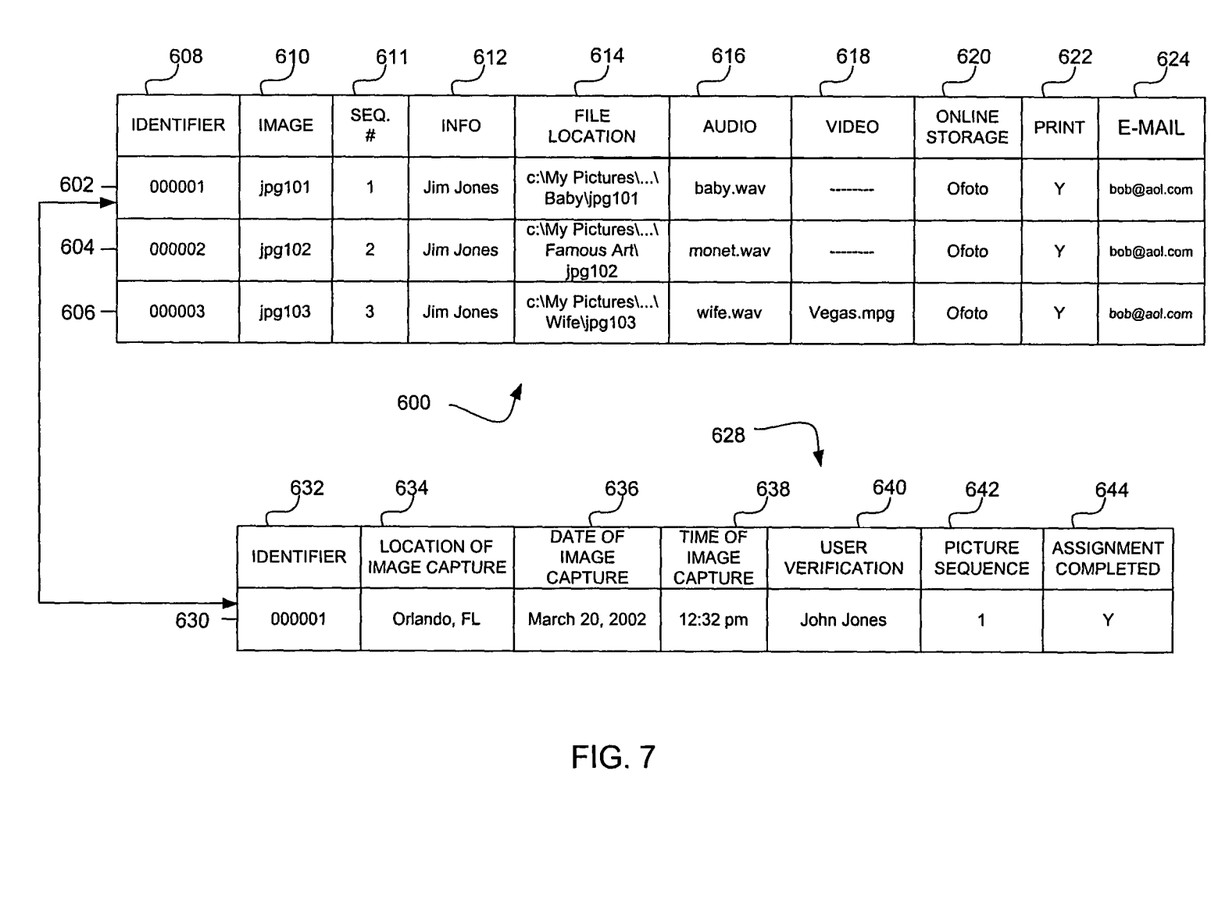
FIG. 7 is a diagram of at least three records of a relational database employed in accordance with the present disclosure.

Referring to FIG. 6A, once information is associated to at least one digital image, the image and associated information is transferred from device 100, 200 and received by local computer 402 (step 502). The local computer 402 will parse the associated information and store each piece of data as a separate field in a single record in a relational database (step 504). An exemplary database 600 is shown in FIG. 7. The database 600 includes a record 602, 604, 606 for each image and further includes a plurality of fields for each record. For example, record 602 includes an identifier field 608 for storing any alpha-numeric identifier associated with the digital image, an image field 610 including the file name of the image, a sequence number field 611 for storing an image sequence number, an info field 612 which may include user information, subject information, image description, date, time, etc., and a file location field 614 for storing the location where the image file is stored. Record 602 also includes an audio field 616 for storing the file name of an associated audio file and a video field 618 for storing the file name of an associated video file. Record 602 further includes request fields, e.g., online storage request field 620, print request field 622 and e-mail request field 624, which will cause the local computer to process and take further action with regard to the image transferred, which will be described in more detail below.

Next, in step 506, the local computer 402 will use relational database programming, e.g., Structured Query Language (SLQ), and standard computer processing power to respond to any user requests for each of the digital images. These requests include but are not limited to displaying the digital images in a particular sequence, or sorting the digital images by owner, date, location, description, etc. The local computer 402 will query each record of the relational database to determine if an action has been requested. For example, the local computer will query e-mail request field 624 to determine if the image is to be e-mailed to another. As shown in FIG. 7, e-mailing the digital images to a person has been indicated by the user, with such person's e-mail address being stored in the relational database, e.g., bob@aol.com. As another example, the local computer 402 will query print request field 622 to determine if the user has flagged the image to be printed upon transfer. The record may include further information regarding printing the image such as a printer location (either local or on the Global Computer Network) and in a size or format that has been requested by the user. As an even further example, the local computer 402 may query online storage request field 620 to determine if the user wants to store the image on a public server for viewing purposes. The field 620 may include the name or location of a professional photo processing location on the Internet, such as ImageStation or Ofoto. Although not shown, each record may include other request fields, for example, fields for requesting the display of information on any selected digital image, such information being contained in the relational database or the display of related audio or video or image files. The inventor understands and current computer database and computer processing techniques teach, that various other requests to the computer processor regarding the digital images and associated files/information may be made by the user, and by using standard programming and computer processing power these requests will be completed by the computer and presented to the user.

The user, or any other party, may print out any of the digital images. The printing will be done once the images are stored on the local computer 402 or a web server 408 on the Global Computer Network and recorded in the relational database 600 as described above. When the images are printed out, the computer that prints the image will cause the image to be printed with symbology that encodes the file name of the image and file location of the image. This file name will be the assigned name that the image was stored in at the relational database, as well as the assigned location of the relational database whether in the user's local computer or at a stored location on the Global Computer Network. Alternatively, the symbology will represent a unique identifier that is created for each image as stored in field 608 of each record in the database. The symbology may be in any form currently practiced in the art including barcodes, photosymbols, standard or specialized text, etc, or any future type of symbology. Of course, any symbology utilized will represent the file names and file locations of the digital images either directly or via an identifier.

At any time, a user may now scan the printed digital images. This scanning may be done by any type of scanner that could read the symbology contained in the printed digital images. Many different types of scanners that read symbology currently exist and the inventor realizes that the type of scanner would depend upon the type of symbology that is utilized in the printed images. Preferably, the scanning of a printed digital image will be performed by the hardware devices 100, 200 described above including the appropriate scanning module.

The device 100, 200 would scan in the symbology and using standard computer programming and computer processing, translate the symbology to extract the name of the digital image and the file locations (whether local or on the Global Computer Network) of the digital image, or alternatively, the identifier of the record relating to the image. This information is then transmitted to the user's local computer along with a user request. In another embodiment, this information would be submitted to the location of the computer indicated in the symbology and, at that location, this query would be submitted to the relational database containing information on the digital images.

The local computer 402 will receive the file name and location or image identifier for at least one image in step 552. Using standard computer programming and processing, the identifier will be submitted to the database (step 554) and the database would then locate the stored digital image and associated files and/or information via its corresponding record (step 556). Once the record is found, the computer will process any user request(s) regarding the digital image that was either transferred with the identifier or after the identifier located the appropriate record. Such requests could include but would not be limited to displaying the digital images in a particular sequence at the local computer or on the imaging device 100, 200; e-mailing the digital image to a person that has been indicated by the user, with such person's e-mail address being stored in the relational database; and printing the digital images at a printer location (either local or on the global computer network) and in a size or format that has been requested by the user. Furthermore, a request may include a request for displaying information on any selected digital image, such information being contained in the relational database, for example, displaying audio or video or image files that are related to the selected digital image. Depending on the request, the image and associated information may be displayed or presented to the user at the local computer 402 or the image and associated information may be transmitted to the imaging device 100, 200 for presentation to the user.

By example, the user holds a scanning device, e.g., imaging device 100, mobile phone 200, etc., over an image of a child on the beach processed via the system and method of the present disclosure. An audio track then comes back: "Daddy I love this beach and I love you" audibly produced via speaker 128, 228 on the device 100, 200 respectively, or alternatively, the image and audio track are presented to the user if they are at the local computer 402. The user would also be able to instantly receive information on the photo such as when and where the photo was taken and who the photographer was. The user could also request that the photo be printed to a local printer in a specific size or that the picture be emailed to a selected recipient. These further requests could be entered either via a keyboard/mouse at the local computer 402 or via input module/speech recognition at the device 100, 200. Other user requests could include requesting the computer to display all associated photos, and file attachments, or to store the photo in a selected location on the local computer or the Global Computer Network.

It is to be appreciated that the software utilized to implement the above methods could reside at server 408 with relational database 600 residing in storage medium 426. Here, the user may employ local computer 402 to transfer the digital images and requests to server 408. In this embodiment, a user could access any of the plurality of images and associated information from any location in the world having access to the Internet. Furthermore, the use of a mobile communication device such as device 200 described above would facilitate the transferring of images and requests to the server 408 by way of a wireless connection either directly to the server 408 or via ISP 412 to the server 408.

The principles of the present disclosure will allow users numerous applications for these imbedded "smart pix" including retrieving image and information from third parties, e.g., a publisher or clearing house. By way of example, a user could see an image in a newspaper or magazine and the user could scan the photo with the hardware device described above. The user could then order the photograph to be downloaded to the user's local computer; request and receive information from the publisher of the image; request and receive other information on the image including attachments; e-mail the photo to someone else; and/or direct the photo to be printed for pickup at a local computer printer or at a commercial printer location.

Figure 8:
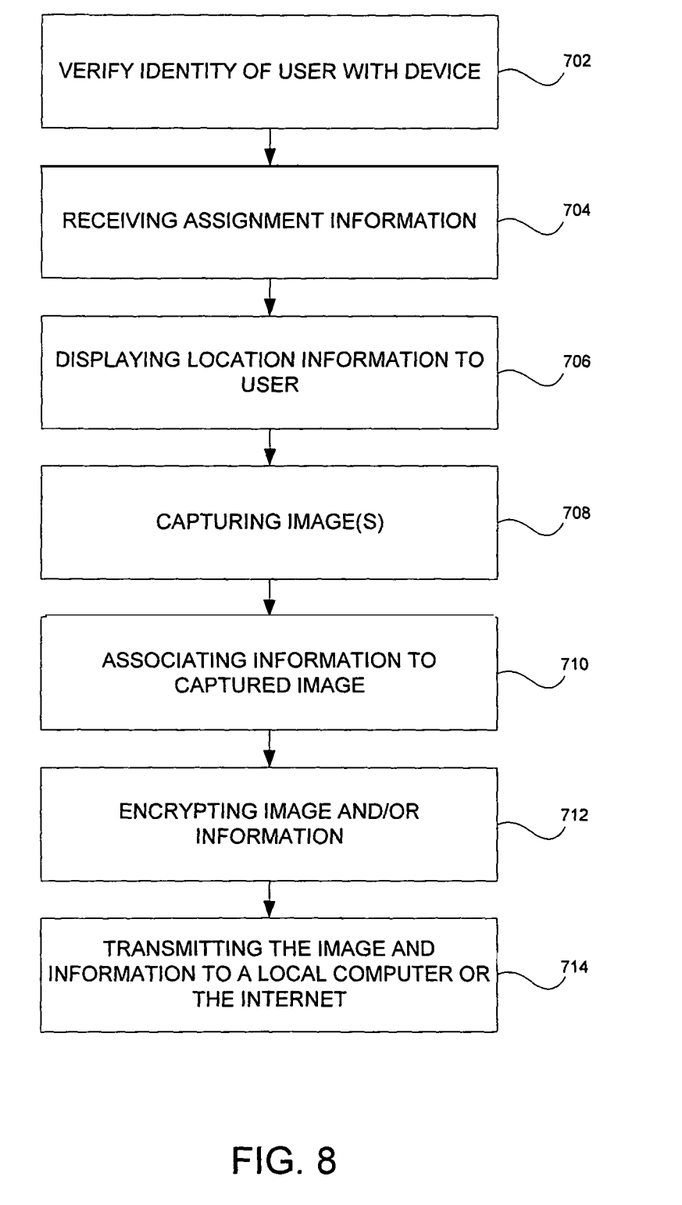
FIG. 8 is a flowchart illustrating a method for verifying activities or assignments of a user employing a device according to an embodiment of the present disclosure.

As a further application of the principles of the present disclosure, an operation of device 100, 200 utilized as a locational image verification device (LIVD) 100 will now be described in relation to FIG. 8.

Initially, when a user receives the locational image verification device (LIVD) 100, the user will initialize the device 100 by registering his identity with the user verification module (UVM) 132 (step 702). The user verification module (UVM) 132 will record the identification information on the user and store it in the storage module 110 or computer memory. This information can later be compared to any other user that uses the user verification module (UVM) 132 so as to establish the identity of the device user.

The user will use the transmission module 112 of the device 100 to receive information through the Global Computer Network from the user's office or supervisor as to the specific geographic assignments that the user has been given (step 704). In a preferred embodiment, this information will be transferred from the user's office or supervisor from a standard relational database that will contain data on the specific locations that the user is expected to visit along with tasks associated with each location. Alternatively, the user may use the user input module 124 to input the various locations of his/her assignment. In either event, this information will be maintained in the device 100 in standard database form in the storage module 110, wherein the user can use the display module 108 to display this information and the user input module 124 and computer processing modules 120 to interact with this information. In another embodiment, this information may be encrypted so that no other person but the user would have access to this information. In this embodiment, the user would be required to use the user verification module 132 to establish his/her identity and, only when identity is established, the computer processing module 120 would direct the encryption module 140 to unencrypt the information.

The user may be routed to his assignments by means of the locational informational module 134 (step 706). This module will receive the information as to specific assignments from the storage module 110, and then display directions on routing with the display module 108. Thus, the user of the LIVD 100 will receive geographic directions to his specific assignments.

When the user arrives at his specific assignment, he may use the device 100 to verify and capture information (step 708). The user will tell the device that he is at the location and ready to proceed by informing the user input module 124, via either text input or spoken word. Alternatively, the auxiliary input module 126 will receive information from the locational information module 134 which will notify the computer processing module 120 to notify the display module 108 that the device has arrived at the assigned location.

Optionally, the user will be asked to use the user verification module 132 to re-verify the user's identity at the time of image capture. If the identify of the user is confirmed by the computer processing module 120, then the device will give the user a certain time interval to use the capture module 122. This time interval may have been set by the user when the device was initialized, or set as a default in the device. The user's identity will be associated to the captured images and stored in the database as will be described below.

The LIVD 100 will now capture digital image(s) and audio streams. This information will then be written to the storage module 110 with additional information provided by the auxiliary input module 126. This module will provide information from the locational information module 134, the date and time module 136, the user verification module 132, the picture sequence module 138 and any information provided by the user input module 124. All of this information will be stored as a file associated with the digital image file, or alternatively, written as an additional part of the digital image file (step 710), as described above.

In a preferred embodiment, all of the information captured by the capture module 122 including the associated information from the auxiliary input module 126, e.g., time and date, the user input module 124, e.g., an audio stream, and the user verification module 132, the user's identity, would be immediately encrypted by the encryption module 140 (step 712). The encryption module 140 will use standard code encryption algorithms currently in use or that will be in use in the future such as DES, Triple DES, Blowfish, RSA, MD5, etc. The user of the device would not have the ability to alter any information that is captured and stored since this information is being encrypted immediately upon capture and then securely stored. Only the receiver of this information (in this example the user's supervisor) would have the ability to unencrypt and modify the information after it has been transmitted.

The user may now use the transmission module 112 to transfer the information to his office or supervisor and/or any party that wants to receive that information (step 714). If the information has been encrypted by the encryption module 140, the receiving party would need to have the encryption key to unencrypt and alter the information. When the data is received, by utilizing a standard relational database, the receiving party will now be able to display images for each location as well as any audio streams for each location, with additional information such as date and time of capture, picture sequence, user identity, and any user notes for each image. The database will also be able to tell the supervisor/user of any locations/events that were not accomplished. Referring to FIG. 7, the information captured and associated will either be incorporated to table 600 or stored as a separate table 628 which is linked to table 600 via the use of private and foreign keys as is known in the art. Record 630 of table 628 will include all the information relevant for verifying at least one assignment or at least one task of an assignment assigned to the user. For example, record 630 will include an identifier field 632 which will also be used as a key for linking the tables, a location of image capture field 634, a date of image capture field 636, a time of image capture field 638, a user verification field 640, a picture sequence field 642 and an assignment completed field 644. Determining whether an assignment is completed can be accomplished either by the user indicating so via the input module or via the computer processing module by comparing user responses to prompted tasks.

Once the images are transmitted and unencrypted, the digital images may be printed with symbology incorporated into the image that fully documents the file storage location of the image, as well as the user identity of the image, date and time of image capture, and picture sequence number, as described in detail above.

In utilizing the locational image verification device described herein, the user will by able to accomplish the various applications of the present disclosure which are described below:

An employee (user) is assigned the responsibility of checking out several residences that have been damaged by a natural disaster. The employer groups these residences along a logical route and downloads this information to the user through the Global Computer Network. The user then receives or transfers this information to his locational image verification device (LIVD) 100. The user takes this device with him as he visits each residence. Using the locational information module 134, the device provides the user with directions via display module 108 to navigate to each residence. During the visit, the user is required to provide proof of damage for the residence by using the LIVD 100. The user is able to photograph the residence damage and each picture is encoded with information detailing the exact location that the image was captured at, the time and date that the image was captured, and the identity information on the person who captured the image. This information is encoded with encryption algorithms immediately upon storage so it is virtually tamper proof. These image files are then transferred wirelessly (or by cable, etc) to the employer. The employer then has proof of the damage to the residence, proof that the damage occurred at a specific address location, proof of the identity of the person who captured the image and visited the residence, and proof of the date and time that the image was captured.

In another example, an employee (user) is assigned by his employer to visit and assess various clients in a social services job situation. The employer groups these residences along a logical route and downloads this information to the user through the Global Computer Network. The user then receives or transfers this information to his locational image verification device (LIVD) 100. The user takes this device with him as he visits each residence. Using the locational information module 134, the device provides the user with directions via display module 108 to navigate to each residence. During the visit, the user is required to provide proof that each client was visited at a specific time and location. The LIVD 100 is used by the user for the purposes of this proof. The user is able to photograph each client and each picture is encoded with information detailing the exact location that the image was captured at, the time and date that the image was captured, and the identity information on the person who captured the image. The user is also able to record audio annotations for each digital image. This information is immediately encoded with encryption algorithms upon storage so it is virtually tamper proof. This image files are then transferred wirelessly (or by wired cable, etc.) to the employer. The employer then has proof of the visit to the residence, proof that the visit occurred at a specific address location, proof of the identity of the person who captured the image(s) and visited the residence, information on each of the digital images, and proof of the date and time that the image Was captured. If a visit was not made, the employer can also be notified of this fact by his computer who is tracking the user information.

In a further example, a military forces personnel is assigned the responsibility of performing various duties on a particular day. The military force personnel's supervisor wants to verify that this mission was accomplished. The personnel is given an LIVD 100 that he carries with him during the mission. The military force personnel initializes the device to establish his identity. The LIVD 100, 200 then is activated and records onto a storage device various images and audio streams during the day. The capture of this information stream of images and audio can be either at random times during the day or at predetermined times. The capture of images and audio can be continuous (e.g. audio/video capture) or in single or multiple images. Each image is encoded with locational information, date and time information, and user identification information. The audio files are matched to the digital image files. The user may be required at various times during the day to randomly or at pre-determined intervals to re-verify his identification information. All of the captured information can be encrypted in secure formats immediately upon capture and storage and before transmittal to the personnel's supervisor. The resulting transfer will give the supervisor a complete and secure record of the user's mission, with documented specificity as to the time/location of various events.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A locational image verification device comprising:
   a user verification module for verifying an identity of a user of the device and providing user identity information, wherein upon verification, the user verification module enables operation of the device;
   a capture module for capturing at least one image and creating a digital image file for each of the at least one captured image, wherein the user verification module verifies the identity of the user of the device at a time when the at least one image is captured;

a locational information module for determining location information related to a location of the device when capturing the at least one image;

a processing module for associating the user identity information and location information to the digital image file; and wherein verifying user identity is to determine whether the user is authorized to operate the device;

wherein the locational information module: receives one or more locations from a remote computer server; determines a present location for the device; and determines the present location is one of the one or more location received from the remote computer server;

wherein the user verification module allows operation of the device without re-verifying user identity until the locational information module determines that the device is not at the present location.

2. The device as in claim 1, wherein the at least one image is multiple images processed in at least one video format.

3. The device as in claim 1, further comprising the display module for displaying the at least one captured image.

4. The device as in claim 3, wherein the display module is adapted to prompt the user to input information regarding the at least one captured image.

5. The device as in claim 1, further comprising a storage module for storing at least one digital image file and the information associated to the at least one digital image file.

6. The device as in claim 1, further comprising a transmission module for transmitting at least one digital image file and its associated information to computing device.

7. The device as in claim 1, further comprising an auxiliary input module for generating auxiliary information related to the at least one captured image, wherein the auxiliary information is date, time and sequence number.

8. The device as in claim 1, further comprising an input module for inputting information regarding the at least one captured image, wherein the processing module associates the inputted information to the respective digital image file.

9. The device as in claim 8, wherein the processing module is adapted to create a separate information file including the location information and inputted information associated to the respective digital image file.

10. The device as in claim 8, wherein the processing module is adapted to append the location information and inputted information to the respective digital image file.

11. The device as in claim 1, further comprising a communication module coupled to an antenna for wirelessly receiving and transmitting communication messages.

12. The device as in claim 11, further comprising a transmission module coupled to the antenna for transmitting at least one digital image file and its associated information to a computing device.

13. The device as in claim 1, further comprising a display module for displaying to a user geographic directions to a location before the at least one image is captured.

14. The device of claim 1, further comprising an encryption module for encrypting the digital image file and associated information upon image capture.

15. The device of claim 1, wherein:

the locational information module: receives one or more locations from a remote computer server; determines a present location for the device; and determines the present location is not one of the one or more location received from the remote computer server;

the user verification module re-verifies the user to operate the device at the present location.

16. A method for associating information with a digital image, the method comprising the steps of:

verifying identity of a user of an imaging device to enable user of the imaging device;

capturing an image with the imaging device and creating a digital image file, the digital image file comprising data related to the captured image;

determining user identity information related to a location of the device upon image capture;

determining location information related to a location of the device upon image capture;

associating the user identity information and location information to the digital image file; and wherein verifying user identity is to determine whether the user is authorized to operate the device;

receiving one or more locations from a remote computer server;

determining a present location that is one of the one or more location received from the remote computer server;

allowing operation of the device without re-verifying user identity until the locational information module determines that the device is not at the present location.

17. The method as in claim 16, further comprising the step of transmitting the encrypted information and digital image file to a computing device.

18. The method as in claim 16, further comprising upon verifying the user, the step of receiving geographic directions to a location before capturing the image.

19. The method as in claim 16, wherein the associating step includes creating a separate information file including the associated information that is associated to the digital image file.

20. The method as in claim 16, wherein the associating step includes appending the associated information to the digital image file.

21. The method as in claim 16, further comprising the steps of:

transmitting the encrypted information and digital image file to a computing device;

unencrypting the information and digital image file at the computing device; and verifying the location and date and time of the image capture.

22. The method as in claim 16, wherein the image is multiple images processed in at least one video format.

23. The method of claim 16, further comprising encrypting the digital image file and associated information upon image capture using an encryption module.

24. The method of claim 16, further comprising:

receiving one or more locations from a remote computer server;

determining a present location for the device that is not one of the one or more location received from the remote computer server;

re-verifying the user to operate the device at the present location.

* * * * *